United States Patent [19]

Rhodes

[11] Patent Number: 4,468,835
[45] Date of Patent: Sep. 4, 1984

[54] AIR VIBRATED DUST BRUSH

[76] Inventor: William A. Rhodes, 4421 N. 13th Pl., Phoenix, Ariz. 85014

[21] Appl. No.: 450,928

[22] Filed: Dec. 20, 1982

[51] Int. Cl.³ .......................... A47L 9/06; A47L 9/08
[52] U.S. Cl. ...................................... 15/381; 15/363; 15/379; 15/404
[58] Field of Search ................. 15/404, 379, 381, 382, 15/405, 408, 363

[56] References Cited

U.S. PATENT DOCUMENTS 1,621,909  3/1927  Smith .............................. 15/379 X
2,637,873  5/1953  Berezny ........................... 15/379 X
3,600,224  8/1971  Stilwell ............................ 15/381 X Primary Examiner—Chris K. Moore
Attorney, Agent, or Firm—Don J. Flickinger

[57] ABSTRACT

A ribbon of flexible fabric (e.g., nylon) is folded and riveted near the fold to form an attachment loop. The loop is then coupled on a centrally located support rod inside an air duct, the ribbon ends extending beyond the exit of the duct. When air is forced through the duct, the free ends oscillate rapidly to brush away particulates on a surface being cleaned. The support rod is a portion of a clip which is removably coupled to the duct. The duct is cylindrical and may comprise a common, commercially available vacuum cleaner tube.

7 Claims, 7 Drawing Figures

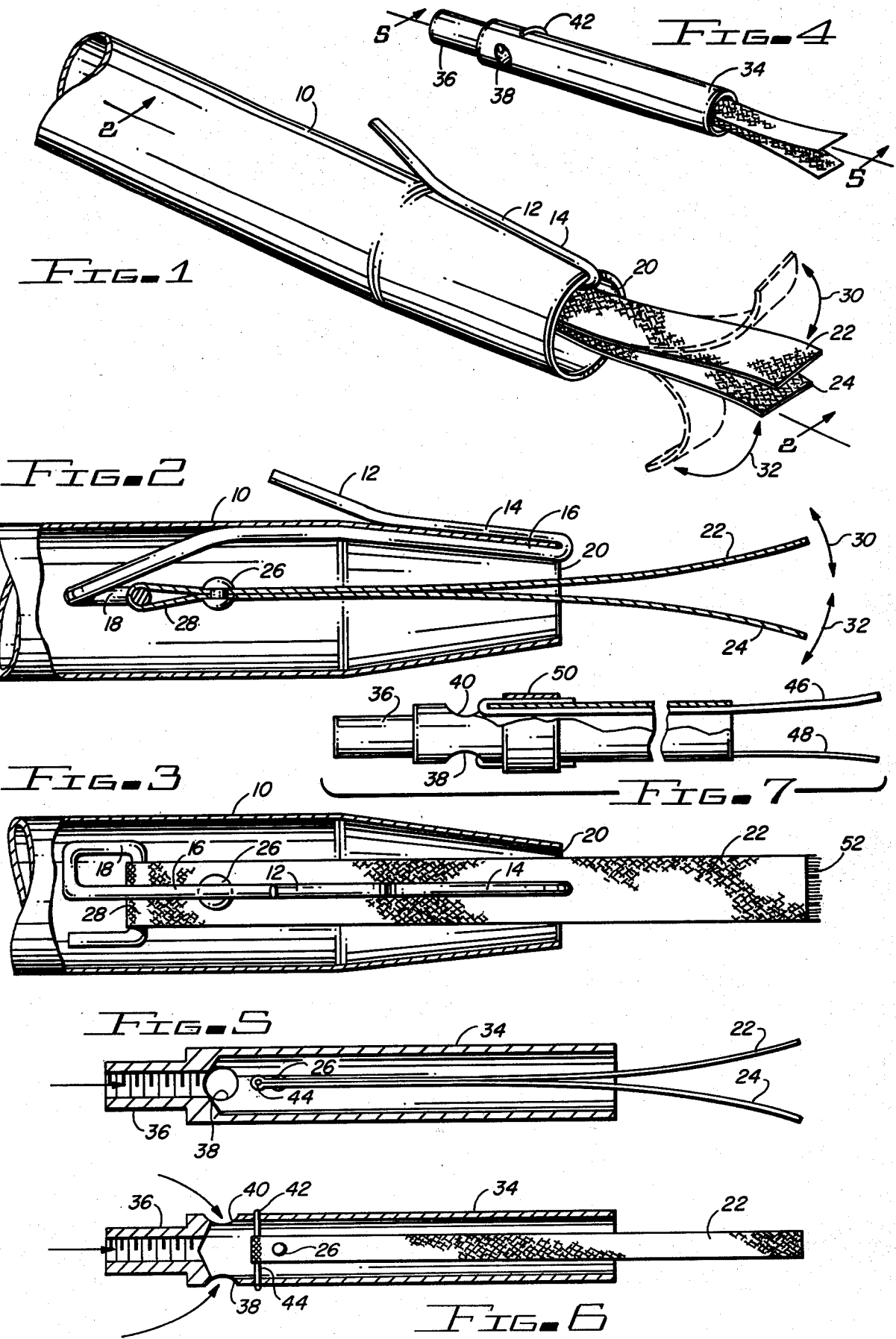

AIR VIBRATED DUST BRUSH

FIELD OF THE INVENTION

This invention relates generally to an apparatus for removing surface dust and, more particulrly, to an air vibrated dust brush for removing dust from delicate surfaces which could not otherwise be removed due to adherence and inaccessibility.

PRIOR ART

Dust on articles in general use may be in the form of (1) particles which can be removed by a blast of air, and (2) paticles which require mechanical agitation for removal. Dust, in either category, can easily be removed from a clean surface by wiping; however, if the surface is complex and/or of a very delicate nature, wiping may not be a suitable method. For example, in the case of printed circuit boards which contain a myriad of delicate parts, hand dusting would be extremely tedious and time consuming, if not impossible. In the past, forced air streams have been the only effective means of removing dust from printed circuit boards; however, such a technique is not effective to remove those particles which require the above mentioned mechanical agitation. Other articles which are extremely difficult to hand dust include bicycles, auto instrument panels, bric-a-brac, piano keyboards, string instrument keyboards, calculator key panels, typewriters, etc.

SUMMARY OF THE INVENTION

It is an object of the present invention to provide an improved apparatus for removing dust particles from complex or delicate surfaces.

It is a further object of the present invention to provide an apparatus for removing dust particles from complex or delicate surfaces which may be used in conjunction with a source of compressed air, a simple hand blower, or a common household vacuum cleaner.

According to a broad aspect of the invention there is a provided a fluid vibrated brush comprising a duct for receiving a stream of forced fluid; and a ribbon of flexible fabric having a first end suspended in the duct and having a second end extending beyond the duct for oscillating rapidly when the fluid flows through the duct.

More specifically, a ribbon of flexible fabric is folded and cemented or riveted near the fold. The folded loop portion is attached to a centrally located suport rod inside an air duct. When air is forced through the duct, the free ends of the ribbon, which protrude beyond the end of the duct, oscillate rapidly to brush and blow away particulates.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view of a first embodiment of the invention;

FIG. 2 is a cross-sectional side view of the apparatus shown in FIG. 1;

FIG. 3 is a cross-sectional top view of the apparatus shown in FIG. 1;

FIG. 4 is a perspective view of a second embodiment of the invention;

FIG. 5 is a cross-sectional side view of the embodiment shown in FIG. 4;

FIG. 6 is a cross-sectional top view of the embodiment shown in FIG. 4; and

FIG. 7 illustrates, partially in cross-sectional form, a third embodiment of the present invention.

DESCRIPTION OF THE PREFERRED EMBODIMENTS

Referring to FIGS. 1, 2 and 3, there is shown a standard vacuum cleaner metal tube 10 which may be coupled to the exhaust port of a standard, commercially available vacuum cleaner in the well known manner. A metal wire clip 12 includes a first longitudinal section 14, a second longitudinal section 16 bent sharply back onto section 14, and a U-shaped transverse section 18. A ribbon of continuous filament material, such as nylon, and having a width not larger than the opening 20 of tube 10 is folded to form first and second ribbon sections 22 and 24, respectively, coupled together by rivet 26, or otherwise secured together near the fold to form an attachment loop 28. As can be seen, attachment loop 28 is positioned over the transverse U-shaped portion of the clip 18. Thus, when the clip slides into position, as is shown in FIGS. 1 and 2, attachment loop 28 is positioned near the center of the tube somewhere upstream of exit 20 and, due to the gripping action of longitudinal clip sections 14 and 16, is held snugly in place.

When air is forced through tube 10, the first and second ribbon sections 22 and 24 will rapidly oscillate in the directions shown by arrows 30 and 32 in FIG. 1. The whipping motion of the ribbon ends may then be used to brush away particles of dust on delicate and/or complex surfaces such as printed circuit boards.

FIGS. 4, 5 and 6 illustrate a second embodiment of the inventive air vibrated dust brush for use in conjunction with a source of compressed air. Like elements have been denoted with like reference numerals. As can be seen, in this embodiment, a tube 34 includes a coupling section 36 which, for example, may be designed to receive an air hose (not shown). First and second ports 38 and 40, respectively, are provided so as to take advantage of the well known Venturi action and the entrainment of additional air. A clip 42 includes a support rod 44 which passes through cylindrical tube 34 and grips the outer surface of tube 34 as specifically illustrated in FIG. 4. As can be seen, support rod 44 passes through the attachment loop 28 of the ribbon.

FIG. 7 illustrates yet another embodiment of the invention wherein first and second ribbons 46 and 48, respectively, pass through ports 38 and 40, respectively, and are secured against the outer surface of cylindrical tube 34 by means of tape 50.

With respect to any of the embodiments described above, it should be clear that ribbon instability during operation must be achieved in order to produce an efficient dusting action. It has been found that optimum instability occurs when the ribbon is suspended in the duct a distance from the duct exit which is four to five times that of the duct's diameter. For example, if the duct has a diameter of one inch, the ribbon suspension point should be four to five inches upstream of the duct exit. At this distance, a ripple effect is produced which increases along the length of the ribbon sections toward the duct opening and prevents a stable ribbon condition from initiating itself. This is true since movement of one ribbon section causes the other ribbon section to move by direct contact or due to air turbulence between and outside the ribbon sections.

Care must be taken in chosing the distance beyond the duct opening to which the ribbons extend. Obviously, if both portions of the ribbon sections which extend outside the duct are too short, the ribbon sections will be incapable of reaching into remote crevices. In addition, shorter ribbon sections mean reduced sweeping action. If, on the other hand, the ribbons are too long, the ribbons may become stable at points along their length and sweeping vigor is lost. It has been found that optimum performance is achieved if the ribbon sections protrude beyond the duct exit a distance of approximately three times that of the tube diameter.

Of course, the restrictions regarding ribbon length become less important in the high pressure embodiments. That is, the higher air velocity through the tube compensates to a great extent for deficiencies in tube/ribbon length proportioning.

As stated previously, the air movement causes the ribbon sections to rapidly oscillate. Air stream instability vigorously opposes both stream and ribbon stability regardless of how the vibrating end is used or at what angle it is applied to the surface being dusted. Stroboscopic observation has indicated that any movement of any ribbon segment will excite the other ribbon segment. Furthermore, since movement of either ribbon section inside the duct disturbs and interferes with laminar air currents, a turbulence is produced which reacts with both ribbon sections in a violent and continuous manner.

During a dusting operation, the above described embodiments operate equally well regardless of the angle of the surface being dusted with respect to the directions of air movement. Where spacial constraints prevent a perpendicular approach, the angle of the approach may be altered until the air stream and ribbons flap sideways against the surface. The agitation of such surfaces is substantially equal from all angles, and ribbon vibration is not confined to right angles.

As stated previously, the ribbon material should be nylon or some other synthetic fabric comprised of continuous filaments. After a brief period of operation, the cross threads at the end of the ribbon sections will begin to unravel as is shown at 52 in FIG. 3 thereby increasing the efficiency of contact.

The above description is given by way of example only. Changes in form and details may be made by one skilled in the art without departing from the scope of the invention. For example, liquid entrainment into the air stream is an obvious modification. The liquid may be water or some form of solvent. Furthermore, the ribbons may have an abrasive tip resulting in a fine sanding action. Alternatively, small weights such as rivets may be attached to the end of the ribbon to provide a peening action. In addition, a pool sweeper may be constructed to clean the submerged concrete faces using the techniques described above.

Having fully described and disclosed the present invention in such clear and concise terms as to enable those skilled in the art to understand and practice the same, the invention claimed is:

1. A fluid vibrated brush comprising:
   a duct for receiving a stream of forced fluid and including;
   an exit, and
   first and second ports upstream of said exit,
   a ribbon within said duct and folded to form
   first and second segments each said segment having an end extending beyond the exit of said duct, and
   a fold intermediate said first and second segments;
   securement means for coupling said first and second segments together proximate said fold to form an attachment loop; and
   a clip passing through said attachment loop and gripping said duct for suspending said ribbon within said duct.

2. A fluid vibrated brush according to claim 1 wherein said duct is a cylindrical tube capable of being coupled to a source of compressed air.

3. A fluid vibrated brush comprising:
   a vacuum cleaner tube for receiving a stream of forced fluid and having an exit;
   a ribbon within said tube and folded to form
   first and second segments, each said segment having an end extending beyond the exit of said tube, and
   a fold intermediate said first and second segments;
   securement means for coupling said first and said second segments together to form an attachment loop; and
   a clip passing through said attachment loop for gripping said duct for suspending said ribbon within said duct.

4. A fluid vibrated brush comprising: p0 a cylindrical tube for receiving a stream of forced fluid and including:
   an exit,
   first and second ports upstream of said exit;
   a ribbon suspended within said tube and including first and second segments, each said segment having an end extending beyond the exit of said tube and another end passing through a respective one of said ports; and
   means for receiving said other ends of said segments to the outer surface of said tube.

5. A fluid vibrated brush according to claim 4 wherein said means for securing is tape.

6. A fluid vibrated brush comprising:
   a duct for receiving a stream of forced fluid and having an exit,
   said duct being in the form of a cylindrical tube having a diameter D; and
   at least one flexible ribbon segment suspended within said duct and having an end extending beyond said exit,
   said segment being supported within said duct at a distance from said exit of approximately 5D.

7. A fluid vibrated brush according to claim 6 wherein said at least one ribbon segment extends beyond said exit a distance approximately equal to 3D.

* * * * *